(12) United States Patent
Miedema

(10) Patent No.: US 10,891,176 B1
(45) Date of Patent: Jan. 12, 2021

(54) OPTIMIZING MESSAGING FLOWS IN A MICROSERVICE ARCHITECTURE

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/536,443

(22) Filed: Aug. 9, 2019

(51) Int. Cl.
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| | | |
|---|---|---|
| 2004/0054690 A1 | 3/2004 | Hillerbrand et al. |
| 2004/0220946 A1 | 11/2004 | Krishnaprasad et al. |
| 2007/0234369 A1* | 10/2007 | Paramisivam ......... G06Q 10/06 719/313 |
| 2008/0133587 A1 | 6/2008 | Ganugapati et al. |
| 2010/0083277 A1 | 4/2010 | Malladi et al. |
| 2011/0138168 A1 | 6/2011 | Peterson et al. |
| 2013/0117326 A1 | 5/2013 | De Smet et al. |
| 2017/0272360 A1 | 9/2017 | Dunn et al. |
| 2018/0077080 A1 | 3/2018 | Gazier et al. |
| 2018/0084063 A1 | 3/2018 | Miedema |
| 2018/0234514 A1* | 8/2018 | Rajiv ..................... H04L 67/125 |
| 2018/0248771 A1 | 8/2018 | Côté et al. |
| 2019/0095258 A1 | 3/2019 | Chandrasekaran |

FOREIGN PATENT DOCUMENTS

CA          2 594 036 A1    7/2006

OTHER PUBLICATIONS

Oct. 27, 2020 International Search Report and Written Opinion for International Application No. PCT/US2020/045332.

* cited by examiner

*Primary Examiner* — Craig C Dorais
(74) *Attorney, Agent, or Firm* — Clements Bernard Walker; Lawrence A. Baratta, Jr.; Christopher L. Bernard

(57) ABSTRACT

In a distributed system with a microservice architecture having a plurality of services and a messaging layer for communication therebetween, systems and methods include receiving messages from a first service to a second service in the messaging layer; queuing responses from the messages; and utilizing one or more bulk messaging techniques to send the responses back to the first service from the second service. The systems and methods can also include maintaining statistics related to the one or more bulk messaging techniques; and automatically determining which of the one or more bulk messaging techniques based on the statistics, to minimize latency of the messaging layer.

20 Claims, 16 Drawing Sheets

Programming cost overhead is managing any change in function declarations and management of stack & heap due to change in sub-task requirement.

N : Session N representing a sub-task
F(N): change in function declarations (passed arguments/return values) at function N
H(N): change in global structures
S(N): change in stack structures
O(N): runtime logical change
C(N): Total cost at frame level
T(N): Total cost
Thus
  T(N) = C(N) + T(N-1)
  T(N-1)= C(N-1) + T(N-2)
  . . .

T(N)   = O(N)
    Collapse to T(N-1) = O(N-1)
            . . .

where C(N) = F(N) + H(N) + S(N)+ O(N)

FIG. 14

```
* External public apis for ddy stack of stack code wrappers
* ddy_session_push       : Push a new session on top of stack of sessions
* ddy_session_pop        : Pop a session off top of stack of sessions
* ddy_session_depth      : Get the current of stack of sessions
* ddy_session_pop_all    : Cleanup/Pop all sessions
* ddy_session_get_next   : Get the next session of stack of sessions
*                          after the cursor (Pass NULL for first)
* ddy_merge_attr_sessions : Merge the specific attr
*                          onto last session from top upto specified count
*                          returns the merged counter
* ddy_merge_all_attrs_sessions : Merge all attrs
*                          onto last session from top upto specified count
*                          returns the merged counter
```

FIG. 17

```
* External public apis for ddy stack code wrappers for desc and data
 * ddy_push_desc          : Push DDY attribute as desc onto stack for
 *                          top session
 * ddy_pop_desc           : Pop DDY attribute as desc from stack for
 *                          top session
 * ddy_stack_depth_desc   : Get the depth of stack of desc for
 *                          top session
 * ddy_get_next_desc      : Get the next desc from stack of desc for
 *                          top session (Pass cursor=NULL for first)
 * ddy_rem_desc           : remove given cursor desc value
 *                          returns last cursor
* External public apis for ddy stack code wrappers for desc and data
* on a specified session
 * ddy_session_push_desc  : Push DDY attribute as desc onto stack for
 *                          given session
 * ddy_session_pop_desc   : Pop DDY attribute as desc from stack for
 *                          given session
 * ddy_session_stack_depth_desc: Get the depth of stack of desc for
 *                          given session
 * ddy_session_get_next_desc: Get the next desc from stack of desc for
 *                          given session (Pass cursor=NULL for first)
```

FIG. 18

```
fn_forever_work_routine() {
    while(return_code != failure)     Existing routine
    {
        push_desc(desc A, val);  /* stack or heap data*/
A "desc"   push_desc(desc B, val);
enforces   val = pop_desc(desc A);
data driven fn_new_sub_task();
metadata   run_time_modify(val);
           push_desc(desc A, val);
           if (val){
               val = pop_desc(desc A);
               RC = send(val);
               push_desc(desc RC, RC);
           }
           while(exists_desc(desc RC))
               if ((return_code = pop_desc(desc RC)) == failure)
                   break;
    }
    pop_session();  /* Automatic Cleanup:
                      desc can describe special cleanup routines*/
}
```

```
fn_new_sub_task(){                              New sub-task
    val = pop_desc(desc A);
    modify(val);                Add another session/sub-task
    push_session();
    push_desc(desc A, val);
    push_desc(desc C, val);
    fnA(); fnB(); fnC() /* Modifies A, B, C */
    {
        val = pop_desc(desc A);
        val = pop_desc(desc C);
        val += pop_session_desc(prev_session, desc B);
        RC = send(val);
    }
    pop_session();
    push_desc(desc RC, RC);    This RC goes onto previous session
}
```

FIG. 19

OPTIMIZING MESSAGING FLOWS IN A MICROSERVICE ARCHITECTURE

FIELD OF THE DISCLOSURE

The present disclosure generally relates to computing. More particularly, the present disclosure relates to systems and methods for normalizing and optimizing messaging flows and virtual programming in a microservice architecture.

BACKGROUND OF THE DISCLOSURE

A Service-Oriented Architecture (SOA) is an approach in software design in which application components provide services to other components via a communications protocol. The principles of service-orientation are independent of any vendor, product, or technology. A service is a self-contained unit of functionality, and services can be combined to provide the functionality of a large software application. A processing device can run any number of services, and each service is built in a way that ensures that the service can exchange information with any other service. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime. One example of a distributed software system that uses services is a network element in a telecommunications network, e.g., an optical network element, router, switch, etc.

BRIEF SUMMARY OF THE DISCLOSURE

In an embodiment, a non-transitory computer-readable medium includes instructions that, when executed, cause a processor to perform the steps of, in a distributed system with a microservice architecture having a framework supporting a messaging layer between client applications and server-side handlers, receiving a message by a server-side handler in the framework with the message one of blocking and non-blocking from a client application; handling the message by the server-side handler as one of blocking and non-blocking selected independent of a designation by the client application since the framework abstracts the messaging layer from the client application; and providing a response by the server-side handler to the client application. When the client application selects blocking for the message and the server-side handler also selects blocking for the message, no abstraction is required by the framework.

When the client application selects non-blocking for the message and the server-side handler also selects non-blocking for the message, the handling can include providing an initial response to the client application and forking a new process by the framework that calls a non-blocking handler; and correlating the message with the new process with an identifier, wherein the response is provided with the identifier. When the client application selects blocking for the message and the server-side handler selects non-blocking for the message, the handling can include utilizing a timer and calling a non-blocking handler; and waiting on a resource from the non-blocking handler until expiration of the time, wherein the response is provided based on one of the resource and the expiration of the timer.

When the client application selects non-blocking for the message and the server-side handler selects blocking for the message, the handling can include providing an initial response to the client application and forking a new process by the framework that calls a blocking handler, wherein the response is provided with an identifier based on a resource from the blocking handler. The messaging layer only supports blocking such that the server-side handler selects blocking regardless of a designation by the client application. The messaging layer only supports non-blocking such that the server-side handler selects non-blocking regardless of a designation by the client application.

In another embodiment, an apparatus includes a processor and memory including instructions that, when executed, cause the processor to execute a server-side handler in a framework supporting a messaging layer between client applications and server-side handlers in a distributed system with a microservice architecture, wherein the server-side handler is configured to receive a message by a server-side handler in the framework with the message one of blocking and non-blocking from a client application, handle the message by the server-side handler as one of blocking and non-blocking selected independent of a designation by the client application since the framework abstracts the messaging layer from the client application, and provide a response by the server-side handler to the client application.

In a further embodiment, a computer-implemented method includes, in a distributed system with a microservice architecture having a framework supporting a messaging layer between client applications and server-side handlers, receiving a message by a server-side handler in the framework with the message one of blocking and non-blocking from a client application; handling the message by the server-side handler as one of blocking and non-blocking selected independent of a designation by the client application since the framework abstracts the messaging layer from the client application; and providing a response by the server-side handler to the client application.

In a further embodiment, a non-transitory computer-readable medium includes instructions that, when executed, cause a processor to perform the steps of, in a distributed system with a microservice architecture having a plurality of services and a messaging layer for communication therebetween, receiving messages from a first service to a second service in the messaging layer; queuing responses from the messages; and utilizing one or more bulk messaging techniques to send the responses back to the first service from the second service. The instructions that, when executed, can further cause the processor to perform the steps of maintaining statistics related to the one or more bulk messaging techniques; and automatically determining which of the one or more bulk messaging techniques based on the statistics, to minimize latency of the messaging layer.

The one or more bulk messaging techniques can include any of time window-based bulking, counter-based bulking, size-based bulking, and transaction-based bulking. The one or more bulk messaging techniques can include multiple bulk messaging techniques, selected to minimize latency of the messaging layer. The one or more bulk messaging techniques can include time window-based bulking where the queuing is over a predetermined time window. The one or more bulk messaging techniques can include counter-based bulking where the queuing is based on a counter. The one or more bulk messaging techniques can include size-based bulking where the queuing is based on a size of each response. The one or more bulk messaging techniques can include transaction-based bulking where the queuing is based on a transaction tag. The first service can be configured to provide information in one or more of the messages related to the one or more bulk messaging techniques.

In a further embodiment, an apparatus includes a processor and memory including instructions that, when executed, cause the processor to execute a messaging layer for communication between a plurality of services in a distributed system with a microservice architecture, wherein the messaging layer is configured to receive messages from a first service to a second service in the messaging layer, queue responses from the messages, and utilize one or more bulk messaging techniques to send the responses back to the first service from the second service.

In a further embodiment, a computer-implemented method includes, in a distributed system with a microservice architecture having a plurality of services and a messaging layer for communication therebetween, receiving messages from a first service to a second service in the messaging layer; queuing responses from the messages; and utilizing one or more bulk messaging techniques to send the responses back to the first service from the second service.

In a further embodiment, a non-transitory computer-readable medium includes instructions that, when executed, cause a processor to perform the steps of, in a distributed system with a microservice architecture having a plurality of services and messaging therebetween, creating programmable stacks of sessions, wherein each session stack is thread-specific; creating programmable stacks of descriptors, wherein each descriptor stack is specific to a session; and passing the programmable stacks of sessions and the programmable stacks of descriptors to one or more services, including across messaging and processor boundaries.

The programmable stacks of sessions and the programmable stacks of descriptors can be utilized for any of Transactional data, Return Codes, Asynchronous messaging, and streaming. The programmable stacks of sessions can be virtual tasks that are created at runtime. The programmable stacks of descriptors can be virtual stacks that are created at runtime. The programmable stacks of sessions and the programmable stacks of descriptors can be schema driven. The programmable stacks of sessions can be automatically created and cleaned up.

In a further embodiment, an apparatus includes a processor and memory including instructions that, when executed, cause the processor to execute a distributed system with a microservice architecture having a plurality of services and messaging therebetween, wherein the distributed system is configured to create programmable stacks of sessions, wherein each session stack is thread specific, create programmable stacks of descriptors, wherein each descriptor stack is specific to a session, and pass the programmable stacks of sessions and the programmable stacks of descriptors to one or more services, including across messaging and processor boundaries.

In a further embodiment, a computer-implemented method includes, in a distributed system with a microservice architecture having a plurality of services and messaging therebetween, creating programmable stacks of sessions, wherein each session stack is thread-specific; creating programmable stacks of descriptors, wherein each descriptor stack is specific to a session; and passing the programmable stacks of sessions and the programmable stacks of descriptors to one or more services, including across messaging and processor boundaries.

BRIEF DESCRIPTION OF THE DRAWINGS

The present disclosure is illustrated and described herein with reference to the various drawings, in which like reference numbers are used to denote like system components/method steps, as appropriate, and in which:

FIG. 14 is a diagram illustrating programming overhead and the cost of recursion with stack-oriented programming;

FIG. 17 is a diagram of an example session Application Programming Interface (API) for the virtual tasks;

FIG. 18 is a diagram of an example descriptor API for the virtual stacks;

FIG. 19 is a diagram of example code utilizing the virtual tasks and virtual stacks;

DETAILED DESCRIPTION OF THE DISCLOSURE

Figure 1:
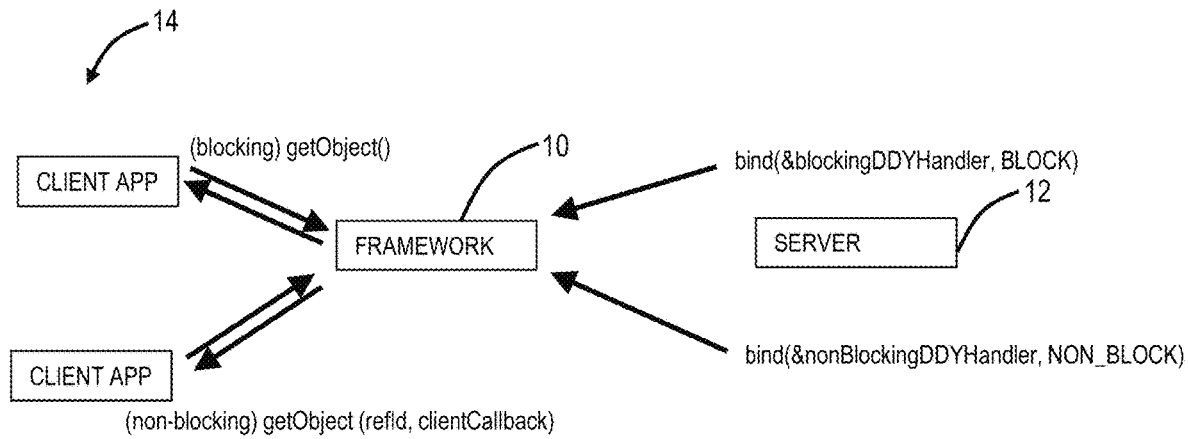
FIG. 1 is a block diagram of message flow abstraction between the server-side handlers and the client application via a framework.

In various embodiments, the present disclosure relates to systems and methods for normalizing and optimizing messaging flows and virtual programming in a microservice architecture. In an embodiment, the present disclosure provides frameworks to be constructed in which messaging layers are completely abstracted to client applications and server-side handlers. Blocking and non-blocking behaviors normally drive significant design activity at the application layer. When the messaging layer only supports one messaging flow, this can drive unwanted impacts on application design. For example, if a messaging layer only supports blocking calls, all management of non-blocking behavior and parallelism must be pushed to every application that desires it. If a messaging layer only supports non-blocking calls, all simplification and correlation of messaging are now pushed to every application that desires a most simplified blocking model. To seamlessly move between blocking and non-blocking behavior would be the tax that would not be justifiable to application designers. Moving this abstraction into the framework allows for full flexibility and design evolvability without changing any application level coding or messaging layer constructs as the system evolves.

In another embodiment, the present disclosure provides the ability to bulk and coalesce messages in a framework, independent of service or transport protocol. This allows for more efficient mechanisms for transport. This opens the possibility of machine learning or tunable settings on a per application layer or per transport layer, without needing to change applications or messaging protocols. This allows microservices to participate in a disaggregated system without exposing details of the messaging layers to the applications, and still obtain the benefits of bulk messaging to reduce chattiness and latency in messaging between services. This also reduces the development cost to application designers and allows tweaking and enhancements in a base layer to automatically be extended to all services that use the framework.

In a further embodiment, virtual tasks and virtual task-stacks along with virtual stacks provide ideal run time polymorphism without programming overhead. With schema/data-driven virtual stacks, this paradigm can span across messaging/processor boundaries.

1.0 Definitions

As described herein, microservices or simply services are software executed on a processing device. Services are fine-grained, and the protocols are lightweight. As services are fine-grained, each service is a small decomposition of a larger, distributed system.

A framework is an abstraction in which software providing functionality can be selectively modified by additional code to provide application-specific software (e.g., a client application or "app"). A framework includes software code that is executed on processing hardware specifically for interaction between client applications and services.

In an example embodiment, a distributed system can include a network element which has multiple services that operate together. However, the distributed system can be any type of system with multiple services. As described herein, a distributed system may be simply referred to as a system. In all embodiments, the system includes processing hardware for executing software code.

A client application is software code executed on processing hardware. The client application can be a service sending a message to another service. The client application can also be a separate application interacting with a distributed system, including various services.

A server-side handler is software code executed on processing hardware. The server-side handler enables communication between the client application and a server.

2.0 Normalizing Message Flows in a Microservice Architecture

In a complex microservices architecture, there may be many types of messaging flows that occur between services in a system. In systems with advanced frameworks, the messaging layers available to the services can be abstracted and hidden from the applications. In systems in which the messaging layers are not abstracted from the services, it is likely that there are very few messaging flows permitted in the system. This reduces the complexity since the services do not need to be coded for many different variants of messaging patterns.

In systems in which many types of the messaging layer are required, it is important that there is a mechanism in which the messaging layer is used in the framework is hidden from the services themselves. This pushes the responsibility of protocol selection and management to the framework and allows the services to only speak to the framework.

When the framework is responsible for selecting the protocol and messaging layer used between services, some characteristics of the messaging layer can be easily negotiated and handled by the framework. These include Port numbers
Data formats
Window sizes
Heartbeats
Retries
Reliability metrics
Sharing models
Queuing models However, some characteristics of the messaging layer are naturally exposed to the client applications. In particular, a trait like whether or not a message is blocking or not is of key importance to the design of a service. Task and processing models within services can change significantly when messaging layers are synchronous (blocking) or asynchronous (non-blocking).

There are a variety of service designs that may require or expect messaging layers to be blocking or non-blocking for their design and a runtime selection of a messaging protocol that does not meet these expectations can cause problems for overall system design.

FIGS. 1-5 are block diagrams of the functionality of a framework 10 for interaction between server-side handlers 12 and client applications 14. The framework 10 includes a messaging layer for communication between the services and the client applications 14. The framework 10 not only hides the underlying nature of the messaging layer from the server-side handlers 12 but also allows the server-side handlers 12 which require a certain behavior to have this requirement met by the framework 10 even if the selected messaging layer does not inherently behave this way. This leads to a wider range of protocols that can be supported, a wider range of service designs that can be accommodated, and a more natural progression of designs from simple to complex that do not require rewriting application level software as messaging flow patterns change.

The main types of messaging flows of interest in the framework 10 are blocking and non-blocking.

2.1 Blocking Messaging

In a blocking or synchronous message, the client (or caller) application 14 will send a message and wait for the result of the message to be returned from the server before proceeding. Error cases can occur in which the message cannot be queued, or cannot be sent to the remote end, and these errors can qualify as a type of response to the client application 14, but the client application 14 will not proceed in its flow until the server has responded with either a failure, or responds to the message itself.

This type of flow is simpler to process because there is no correlation needed between the outgoing message and the incoming response. The request and response are always paired, and the flow cannot continue until the outcome of the message has been handed. This type of flow is common in systems. Hypertext Transfer Protocol (HTTP) uses this exclusively as a messaging flow. Parallelism with blocking messages is handled by spawning multiple threads and having each thread handle a request and a response. This requires specific programming on the client application 14 to handle the threads and aggregating responses.

Blocking messaging does not allow the client application 14 to do additional work while the response is pending, which has scalability concerns. Blocking messaging guarantees ordered processing of messages since another message cannot be sent in the same thread until the response from the previous message has been processed.

2.2 Non-Blocking Messaging

In a non-blocking or asynchronous messaging flow, the client application 14 will send a message and (may) wait for basic acknowledgment from the sending Application Programming Interface (API) that the request has been queued or handled. This response can come from the local messaging layer ("message queued for send"), or from the server ("message received"), but the processing and actual response to the message is not sent immediately. Instead, the response (or responses) will be sent asynchronously from the server-side handler 12 as it is processed.

In order for the incoming response(s) to be correlated to the original request and routed to the appropriate caller, some additional data is normally required, such as correlation tag(s), receiver information, error handling, etc. The correlation tag(s) are a unique tag attached by the messaging layer that can be used to correlated response(s) to the original sender. This can be added by the client application 14 (client tag) if the client application 14 has a threading model in which a common thread can handle responses for many senders. The messaging layer may also add a tag (messaging tag) to simply correlate a response to the appropriate message and to find a callback or function to invoke to handle the processing of the response.

For the receiver information, once the response has been accepted, and the tags used to correlate to the original message, the messaging layer needs to invoke a receiver function to handle the response. The receiver data can be embedded in the message itself, but this is unlikely since it is data the server does not need to know about. Normally, the receiver data (callback function, signal, event, queue id, etc.) is registered in advance with the messaging system or is provided at the time the message is sent.

For the error handling, the timeout information may also need to be provided in case a response is not processed by a certain timeout. The messaging layer will then call the receiver function with an error code that indicates the failure to receive a response. Any incoming response for this message after this timeout has occurred will be discarded. The criticality can be high or low priority, and, for retries, in case of a failure, the client application 14 can choose to retry the message a certain number of times before reporting a failure. Normally, a client application 14 must know in advance what type of messaging will be invoked when a request is made since the data provided in either case is very different.

2.3 Message Flow Abstraction

FIG. 1 is a block diagram of message flow abstraction between the server-side handlers 12 and the client application 14 via the framework 10. The framework 10 abstracts away the details of a messaging layer from the client applications 14, supports both blocking and non-blocking messaging flows at the messaging layer and has requirements for the client applications 14 that can request both blocking and non-blocking messaging. Specifically, the framework 10 includes the messaging layer. The framework 10 may utilize a Data-Driven Framework (DDF).

In FIG. 1, two example client applications 14 are illustrated, one for a blocking message request—getObject( ) and one for a non-blocking message request—getObject(refId, clientCallback). The client applications 14 can specify in attributes whether the getObject can block or not. If not, a callback and refId must be provided. The server-side handlers 12 can specify binding in handlers (DDFHandler) whether they are blocking or not, i.e., bind(&blockingDDYHandler, BLOCK) or bind(&nonBlockingDDYHandler, NON_BLOCK). DDF YANG (Yet Another Next Generation) can use this flag to determine how to invoke.

There are four possible combinations as follows:

|  |  | Messaging Layer | |
| --- | --- | --- | --- |
|  |  | Blocking | Non-blocking |
| Client request | Blocking | No abstraction needed | Internal blocking required |
|  | Non-blocking | Internal threading required | Client/Message correlation needed |

2.4 Client Blocking, Messaging Blocking

Figure 2:
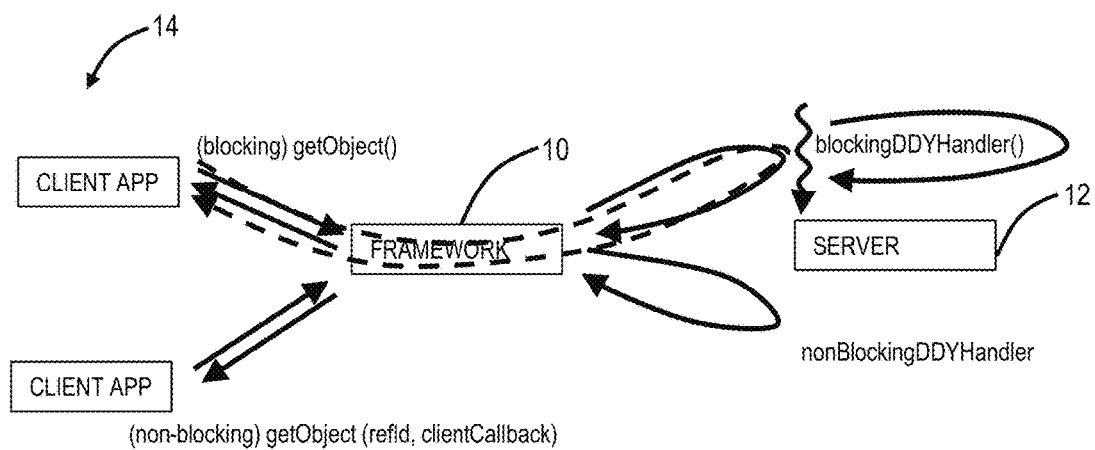
FIG. 2 is a block diagram of message flow abstraction between the server-side handler and the client application via the framework for client blocking and message blocking.

FIG. 2 is a block diagram of message flow abstraction between the server-side handler 12 and the client application 14 via the framework 10 for client blocking and message blocking. When the client application 14 requires a blocking message, and this flow aligns with the messaging layer, there is no abstraction needed, i.e., direct handler invocation in the client thread context. A blocking call from the client application 14 will be sent directly to the messaging layer where it will block, and the response will traverse the entire path to the client application 14 when it arrives.

2.5 Client Non-Blocking, Messaging Non-Blocking

Figure 3:
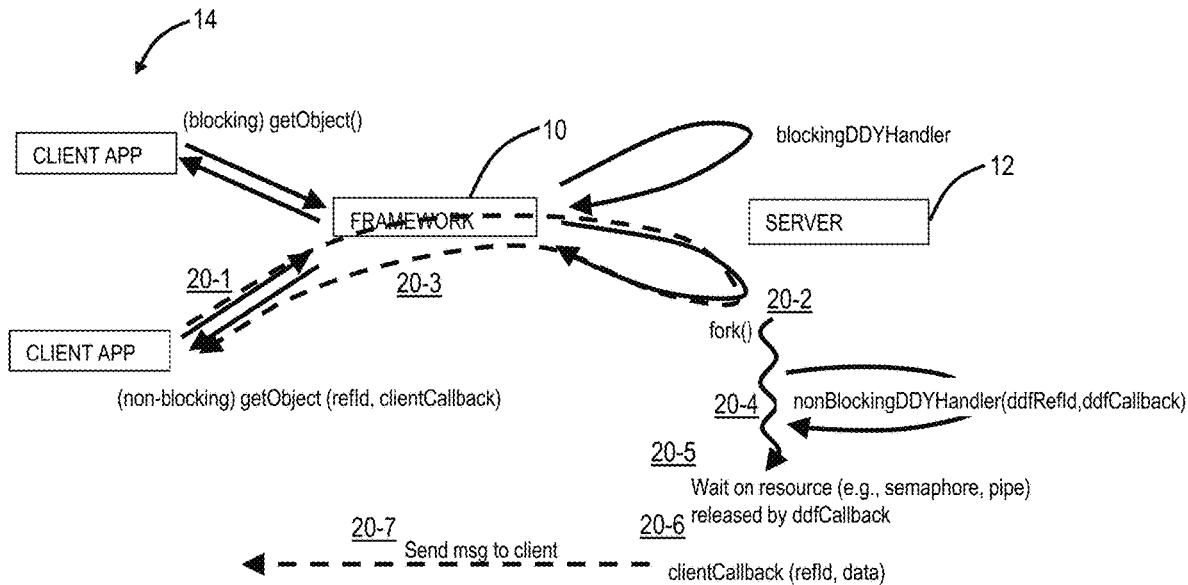
FIG. 3 is a block diagram of message flow abstraction between the server-side handler and the client application via the framework for client non-blocking and messaging non-blocking.

FIG. 3 is a block diagram of message flow abstraction between the server-side handler 12 and the client application 14 via the framework 10 for client non-blocking and messaging non-blocking. When the client application 14 requires a non-blocking message, and this is what the messaging layer provides, some level of correlation between the client application 14 and the messaging layer is needed. A non-blocking call from the client application 14 will be sent directly to the messaging layer, and the initial response will be sent back to the sender. The receiver information from the client application 14 will need to be stored internally and correlated to the asynchronous message sent at the messaging layer. When the response comes from the server-side handler 12, this correlation is used to find the receiver and invoke it. Different timeout and error handling requirements between the client application 14 and messaging layer may also need to be managed.

The message flow in FIG. 3 includes the client application 14 requesting a non-blocking message (step 20-1); the framework 10 forks a new process (step 20-2); the client thread returns (step 20-3); the forked process calls a non-blocking handler (step 20-4); the forked process waits on the resource (step 20-5); the resource is unlocked (e.g., by ddfCallback) (step 20-6); and a client callback is invoked (step 20-7).

2.6 Client Blocking, Messaging Non-Blocking

Figure 4:
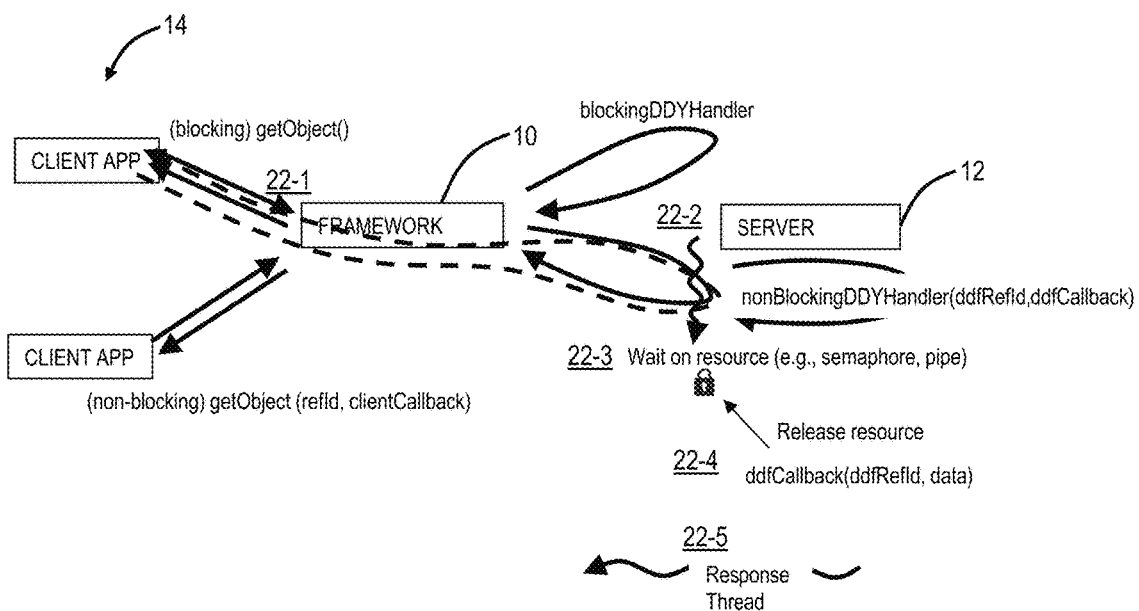
FIG. 4 is a block diagram of message flow abstraction between the server-side handler and the client application via the framework for client blocking and messaging non-blocking.

FIG. 4 is a block diagram of message flow abstraction between the server-side handler 12 and the client application 14 via the framework 10 for client blocking and messaging non-blocking. The goal of this abstraction is to make an internal non-blocking call look like a blocking call to the client application 14. From a threading model, the client application 14 must not return until the response has arrived.

This implies a mutex or a semaphore internal to the messaging API to block the client application 14 until the response arrives, the construction of a non-blocking call internal to the messaging layer, dispatching the message to the server-side handler 12, handling a successful response or error, invoking an internal receiver function for the non-blocking response, extracting the response data from a successful response, or the error from a failed or timed out response, making this data available to the client thread, currently blocked, and unblocking the client thread.

The message flow in FIG. 4 includes the client application requesting a blocking message (step 22-1); the framework 10 starts a timeout timer, caches client context, and calls non-blocking handler in a client thread (step 22-2); the framework 10 waits on the resource (step 22-3); the response thread calls ddfCallback which unblocks the caller or if the timer expires, the client context is cleaned up, and the caller is unblocked (step 22-4); and the client thread returns (step 22-5).

2.7 Client Non-Blocking, Messaging Blocking

Figure 5:
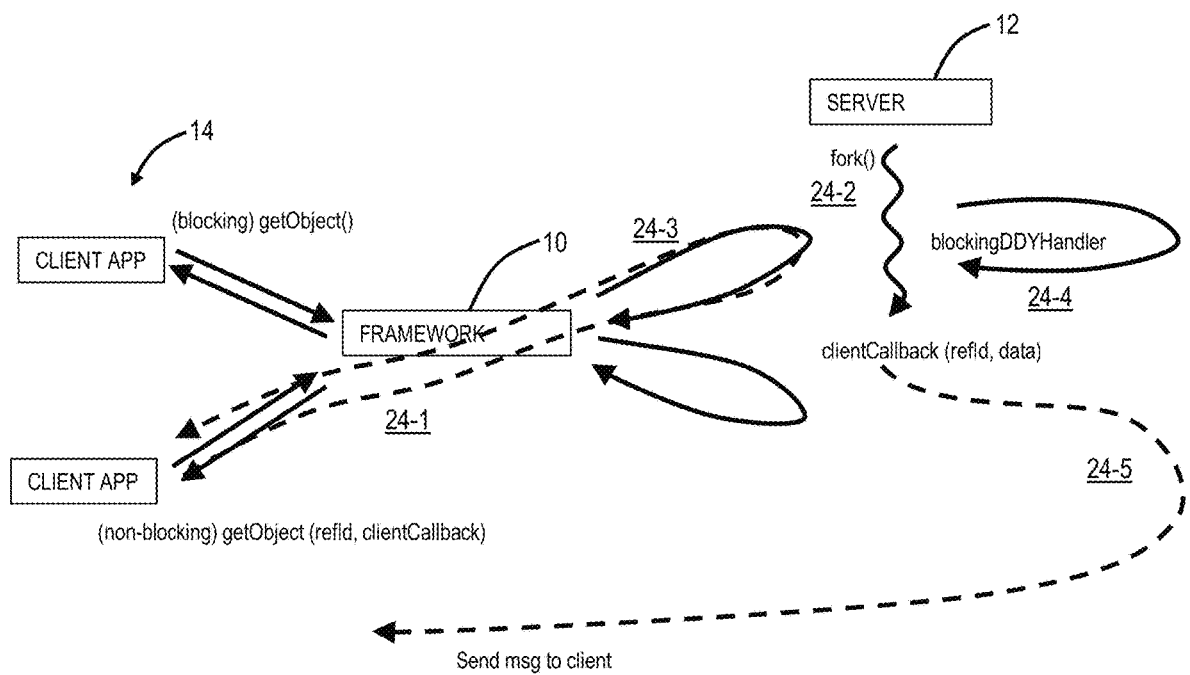
FIG. 5 is a block diagram of message flow abstraction between the server-side handler and the client application via the framework for client non-blocking and messaging blocking.

FIG. 5 is a block diagram of message flow abstraction between the server-side handler 12 and the client application 14 via the framework 10 for client non-blocking and messaging blocking. When the client application 14 requests a non-blocking call, and the messaging layer only supports a blocking call, internal threading is needed to invoke the request. A client request is received with the non-blocking metadata, and a local thread is used with this data to handle the message request and wait for the response from the server. If a timeout occurs before the blocking call can return, an error is sent to the client application 14, and the thread may be destroyed or returned to a pool. When a successful response is obtained from the blocking call, the data is extracted from the message. The client receiver function is invoked from the internal thread with the data from the response and the non-blocking metadata provided by the client application 14.

The message flow in FIG. 5 includes the client application 14 sending a non-blocking message (step 24-1); the framework 10 forks a new process (step 24-2); the client thread returns (step 24-3); the forked process calls a blocking handler (step 24-4); and a client callback is invoked (step 24-5).

2.8 Process for Normalizing Message Flows in a Microservice Architecture

Figure 6:
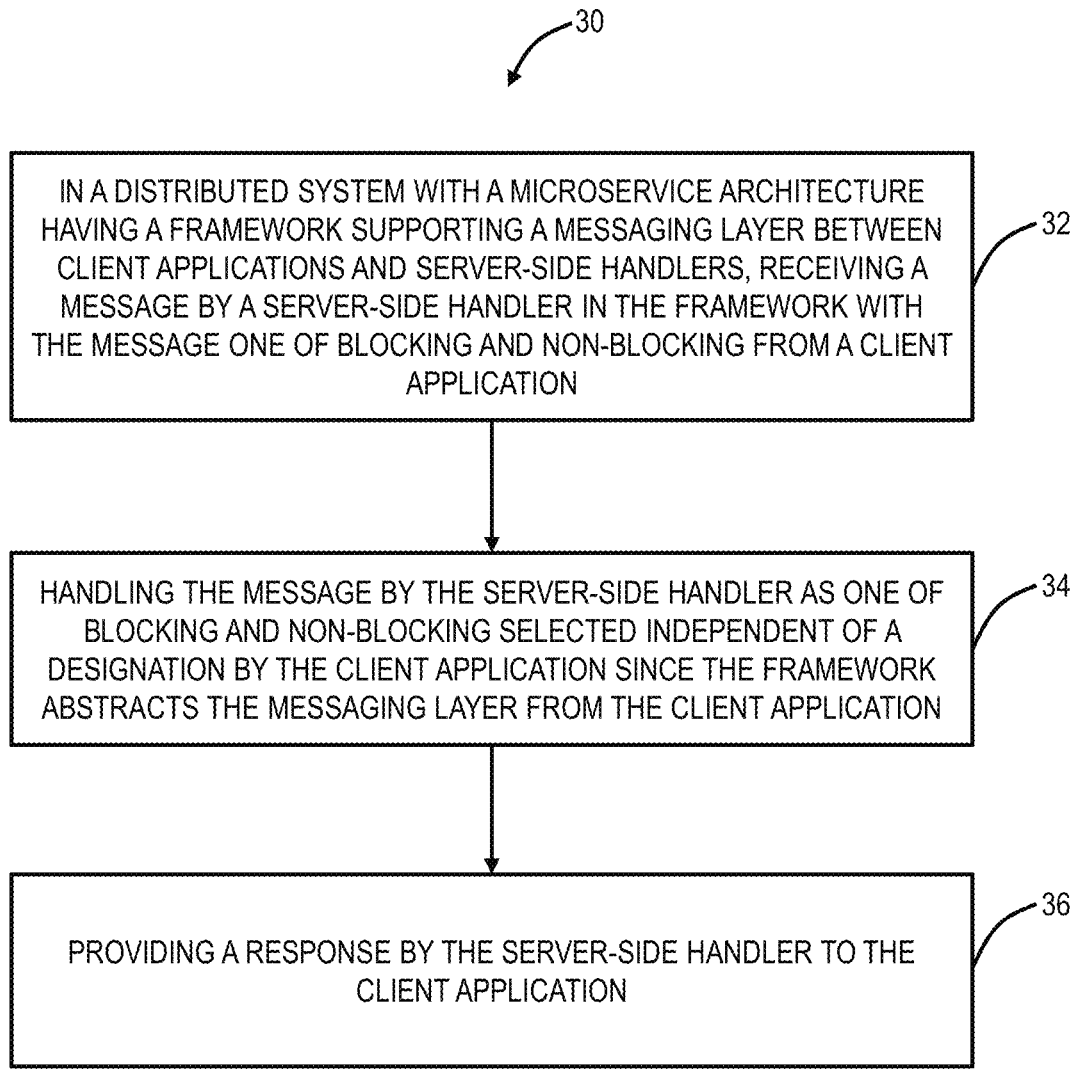
FIG. 6 is a flowchart of a process for normalizing message flows in a Microservice Architecture.

FIG. 6 is a flowchart of a process 30 for normalizing message flows in a Microservice Architecture. The process 30 is computer-implemented and includes, in a distributed system with a microservice architecture having a framework supporting a messaging layer between client applications and server-side handlers, receiving a message by a server-side handler in the framework with the message one of blocking and non-blocking from a client application (step 32); handling the message by the server-side handler as one of blocking and non-blocking selected independent of a designation by the client application since the framework abstracts the messaging layer from the client application (step 34); and providing a response by the server-side handler to the client application (step 36).

When the client application selects blocking for the message, and the server-side handler also selects blocking for the message, no abstraction is required by the framework. When the client application selects non-blocking for the message and the server-side handler also selects non-blocking for the message, the handling can include providing an initial response to the client application and forking a new process by the framework that calls a non-blocking handler; and correlating the message with the new process with an identifier, wherein the response is provided with the identifier.

When the client application selects blocking for the message and the server-side handler selects non-blocking for the message, the handling can include utilizing a timer and calling a non-blocking handler; and waiting on a resource from the non-blocking handler until expiration of the time, wherein the response is provided based on one of the resources and the expiration of the timer.

When the client application selects non-blocking for the message, and the server-side handler selects blocking for the message, the handling can include providing an initial response to the client application and forking a new process by the framework that calls a blocking handler, wherein the response is provided with an identifier based on a resource from the blocking handler.

The messaging layer can one of i) only support blocking such that the server-side handler selects blocking regardless of a designation by the client application, and ii) only support non-blocking such that the server-side handler selects non-blocking regardless of a designation by the client application.

3.0 Reducing and Optimizing Message Flows in a Microservice Architecture

Again, in a distributed microservice architecture, many services run and are decoupled from one another. Data ownership is distributed, and the data that one service needs to function may exist in many other services. This may require frequent messaging to determine the current operational state and/or configuration of the other relevant services in the deployment. Even within a service, many resources may exist, and the service may have independent controllers for each resource, each making their own queries to many other services.

The "chattiness" of these services can, in many cases, be engineered up front to be minimized, but in many cases, the messaging could be made more efficient if the overall system behavior was well understood. This is not always possible in an architecture such as this, because the deployments (which services are deployed where) can change at run-time.

The cost of messaging can be threefold: first, an encoding cost (how much processing does it take to encode and decode a message); second, a bandwidth cost (how much data needs to be sent); and third, a latency cost (what is the delay experienced with the transport of the message itself). Of these three costs, latency cost can be considerable, and bundling or bulking of messages can greatly reduce this cost, especially if the messaging protocol is blocking and messages are sent serially (the next cannot be sent until the previous message is processed).

The present disclosure described a framework that can automatically bulk messages between two endpoints together to save on the latency cost of the messaging layer.

3.1 Bulk Messaging Techniques

When a service is sending many messages to another service, it may not always be obvious to the sender that it is inefficient. Control applications may be requesting granular data from another service. Many control applications running at once may be requesting the same data from another service, and if the architecture can detect similar types of flows and perform bulking, the system efficiency may improve.

There are multiple techniques to bulk messages together in a framework, such as time window-based bulking, counter-based bulking, size-based bulking, and transaction-based bulking.

For time window-based bulking, if a service has many requests being sent to another service, sending the data can be held off to allow for more requests to be made and bulk the requests into a larger message to send. A time window can be specified that places an upper bound on the delay incurred by the time window and when that time-period expires, all messages that have been bulked up to that point can be sent in the same request.

For counter-based bulking, sending the data can be held off based on a message counter. A message counter can be provided that places an upper bound on the number of messages to be bundled together, and when that counter level is met, all messages that have been bulked up to that point can be sent in the same request.

For size-based bulking, transport layers may have a message size that is most efficient since messages below a certain size may more easily fit into a transport window or avoid the need for segmentation and reassembly. A message size limit can be provided that can be tracked for a given transport, and hold off sending the message as long as the size is below that limit.

For transaction-based bulking, an application may have a higher-level view of the set of messages associated together in one transaction. For example, a higher-level controller may have knowledge of a control loop iteration, even if the lower levels do not understand the context that the messages are being sent under. If there is a tag of some sort that is associated with messages that are related in one group, then messages related to that tag can be bulked and sent explicitly when the complete message has been assembled, and the higher-level application knows that all requests have been performed.

3.2 Tuning of Bulk Messaging Techniques

The aforementioned bulk messaging techniques may be implemented individually or may be implemented in a way that allows the techniques to be combined. The thresholds and limits in these techniques may also benefit from machine learning or tuning to allow for the system to dynamically respond. Specifically, the system can "learn" to automatically determine which of the bulk messaging techniques to use given various circumstances. The system can keep statistics related to savings (in latency, encoding, and bandwidth costs), enabling the system to train itself on where to use each of the techniques.

Limits can also be application specific. Some applications may tolerate higher delays, and others may need each message to be as fast as possible In addition to the tuning of the bulk techniques on the server-side, the client application 14 can be able to include information on bulking options. This information may specify to send now (no bulking), wait up to X milliseconds for bulking, always bulk with others of the same session/tag, etc. The aspect of bulk messaging with others of the same session/tag is similar to a transaction model for sets. Here, the client application 14 can have a session/transaction ID/tag that is inserted into all requests.

3.3 Mechanisms for Bulking

Figure 7:
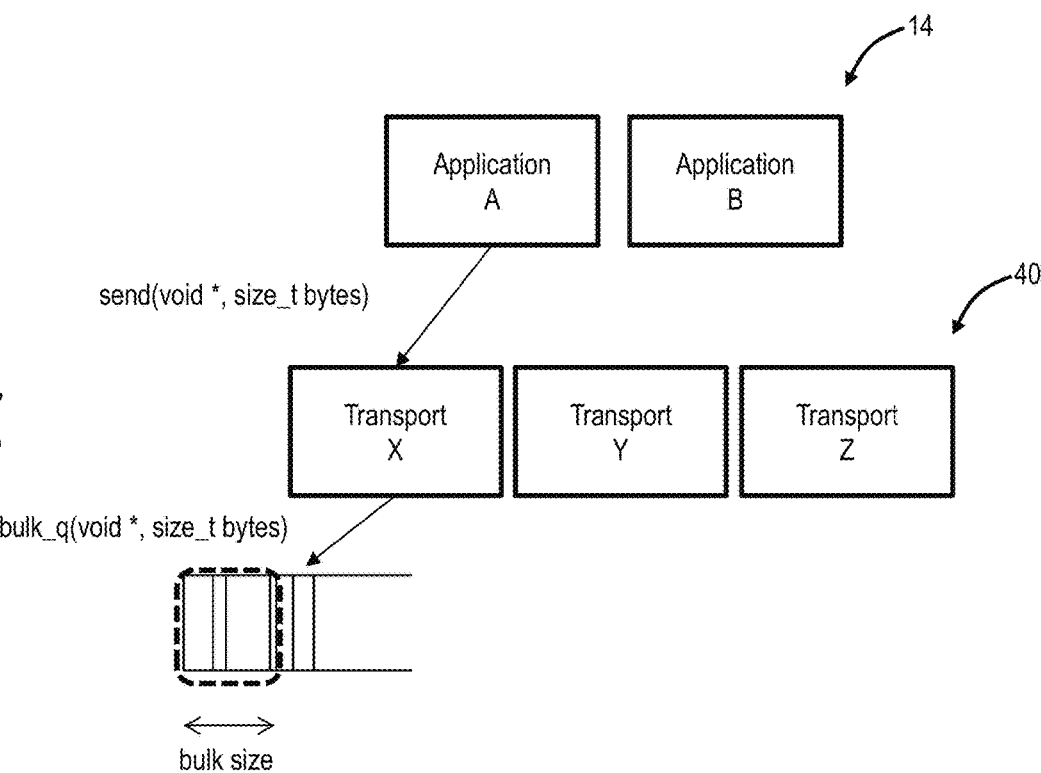
FIG. 7 is a block diagram of a transport layer for bulk messaging.
Figure 8:
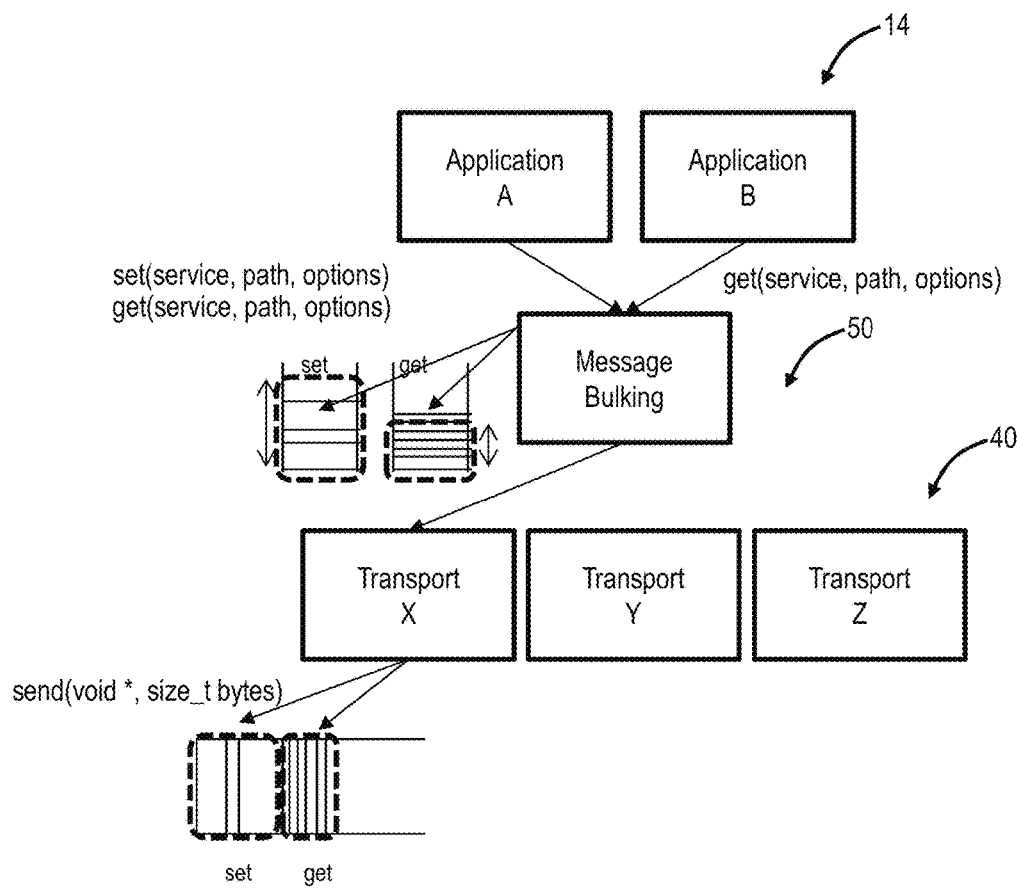
FIG. 8 is a block diagram of a framework that can exist at a layer between the transport layer and applications.

The mechanisms used for bulking can be different based on how much knowledge the architecture has of the message content and the applications. FIG. 7 is a block diagram of a transport layer 40 for bulk messaging. FIG. 8 is a block diagram of a framework 50 that can exist at a layer between the transport layer 40 and applications 14.

In FIG. 7, for systems in which the transport layer 40 is agnostic to the application message content, there is very little that can be done apart from timing and message count/size. The specific contents of the message cannot be used to help classify content for bulking support. For example, the client applications 14 sent messages to the transport layer 40, and the transport layer 40 can support bulk messaging.

In FIG. 8, if the messaging layer is part of the framework 50 and can exist at a layer between the client applications 14 and the transport layer 40, much more value can be extracted from bundling at this layer. The value of this middleware of the framework 50 is it can understand the services involved in the messages, can understand latency requirements and typical message flows per service. Further, the framework 50 can understand the specific content of the messages, to group all messages of one type into a bulked message ("get" messages) and allow others to flow as soon as possible ("RPC" or "notify" messages).

The framework 50 can support bulking independent of the transport protocol since the bulking is done in a layer above the transport layer 40, it can be implemented once and will be used and usable by all transport layers 40. Finally, the framework 50 can support "coalescing" of messages. Here, frequent messages can be throttled and summarized to the latest state periodically, and multiple "set" or "get" actions can be combined into one action, not just grouped into the same message.

3.4 Value of Bulk Messaging

Figure 9:
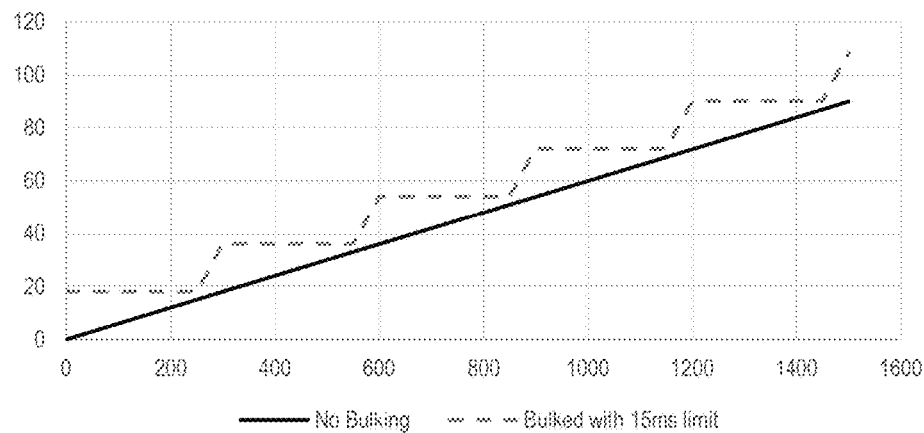
FIGS. 9, 10, and 11 are graphs of performance of bulk messaging with different message latency values.
Figure 10:
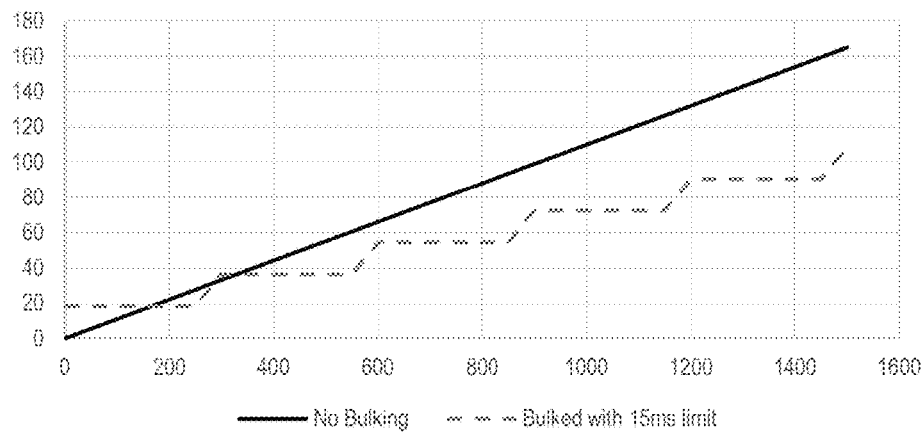
Figure 11:
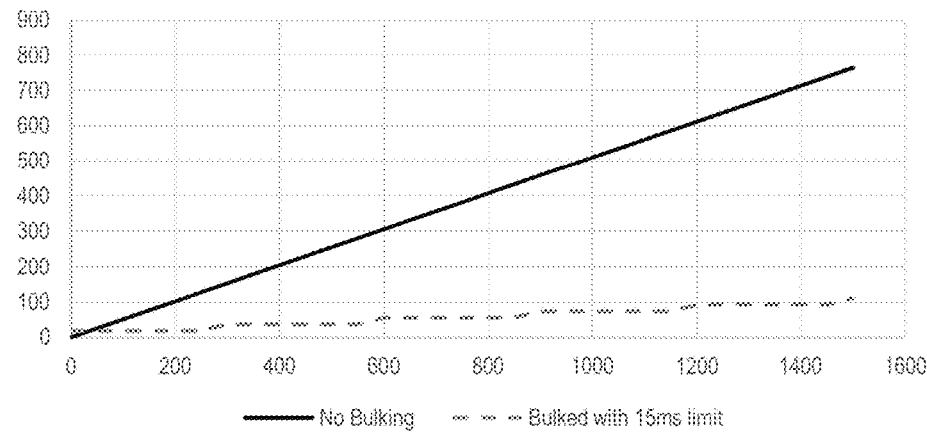

In cases where the message latency is low, bulking does not provide any value, and may actually slow things down. FIGS. 9, 10, and 11 are graphs of performance of bulk messaging with different message latency values. In an example operation, illustrated in FIG. 9, a bulker will wait 15 ms for messages to accumulate before it is sent. This assumes that the application 14 can enqueue a message every 50 µs, so on average, 300 messages are enqueued into one message. It also assumes a latency overhead based on the size of the message as it grows. As is seen in FIG. 9, it is faster in general for bulking not to be used here for all messages.

When per-message latency increases, the value become more obvious. In an example operation, illustrated in FIG. 10, the latency of each message is 0.1 ms. For small numbers of messages, bulking does not show any advantage, and the time spent waiting is of little value. As the number of messages increases, the value in bulking reduces the total time taken to send the set of messages even though the per-message latency increases a little due to the size increase When per-message latency increases even more, in this case, up to 0.5 ms, as illustrated in FIG. 11, bulking is beneficial even for very low message counts. As seen in FIG. 11, latency measurement and correlation based on size and protocol may be used to automatically tune the messaging layer for applications which do not need the message sent immediately.

3.5 Bulk Messaging Process

Figure 12:
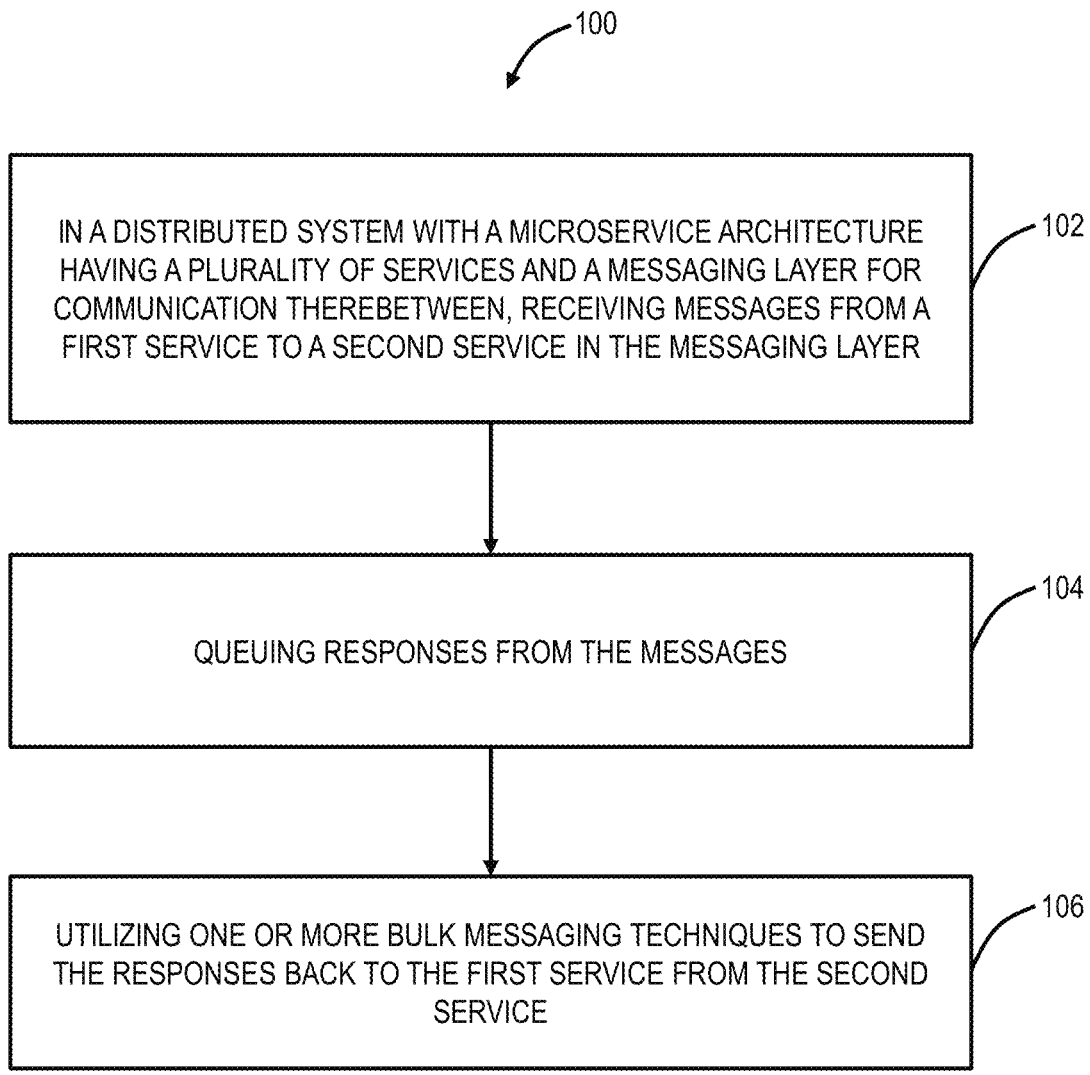
FIG. 12 is a flowchart of a process for bulk messaging in a Microservice Architecture.

FIG. 12 is a flowchart of a process 100 for bulk messaging in a Microservice Architecture. The process 100 includes, in a distributed system with a microservice architecture having a plurality of services and a messaging layer for communication therebetween, receiving messages from a first service to a second service in the messaging layer (step 102); queuing responses from the messages (step 104); and utilizing one or more bulk messaging techniques to send the responses back to the first service from the second service (step 106). The process 100 can also include maintaining statistics related to the one or more bulk messaging techniques; and automatically determining which of the one or more bulk messaging techniques based on the statistics, to minimize the latency of the messaging layer.

The one or more bulk messaging techniques can include any of time window-based bulking, counter-based bulking, size-based bulking, and transaction-based bulking. The one or more bulk messaging techniques can include multiple bulk messaging techniques, selected to minimize the latency of the messaging layer. The one or more bulk messaging techniques can include time window-based bulking where the queuing is over a predetermined time window. The one or more bulk messaging techniques can include counter-based bulking where the queuing is based on a counter. The one or more bulk messaging techniques can include size-based bulking where the queuing is based on the size of each response. The one or more bulk messaging techniques can include transaction-based bulking where the queuing is based on a transaction tag. The first service can be configured to provide information in one or more of the messages related to the one or more bulk messaging techniques.

4.0 Virtual Tasks-Stacks Programming in a Microservice Architecture

In a distributed architecture, task models break every time control passes from one service to another. Programming practices such as parallel processing and session/transaction management further adds to the complexity. The present disclosure includes a programming mechanism with virtual tasks and virtual stacks, where the system can not only track but also modify, add, remove, and process both data and metadata at runtime without the overhead of changing code interfaces. This can be performed for tasks (the execution flow) and the stack (the data associated with that data) and can span tasks and processes in a distributed architecture. Also, the use of a virtual-stack at runtime means that the true language-oriented APIs (function calls) do not need to change when APIs change and allows prototype and invocation extensions without modifying the core code.

Accordingly, the present disclosure includes virtual tasks and virtual task-stacks along with virtual stacks to provide ideal runtime polymorphism without programming overhead. With schema/data-driven virtual stacks, this approach can span across messaging/processor boundaries.

4.1 Problem Definition

Figure 13:
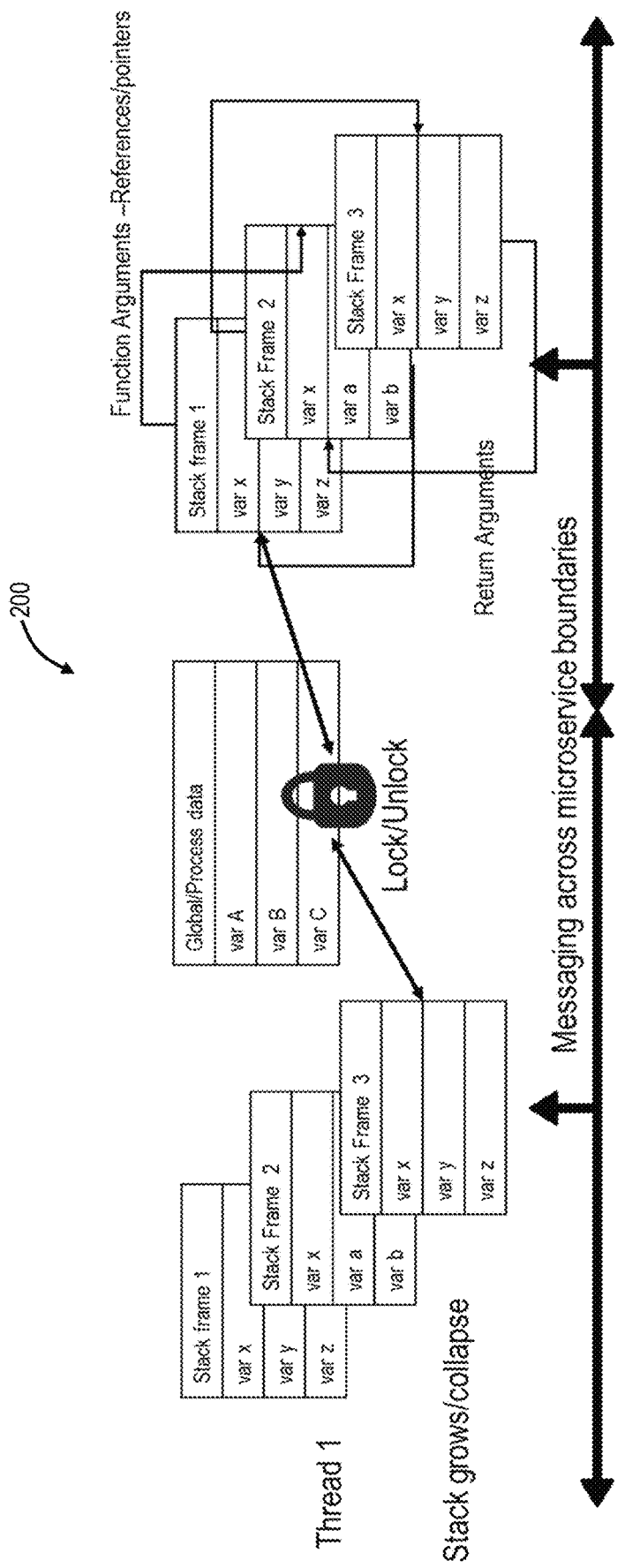
FIG. 13 is a block diagram of a runtime diagram of virtual tasks and virtual stacks.

FIG. 13 is a block diagram of a distributed system 200 having messaging across microservice boundaries. The distributed system 200 requires function interfaces changes for passed/returned arguments across call stacks in running thread contexts, changes in stack/global data structures which introduce synchronization overheads for re-entrant programming, and added complexity in applications for serialization and deserialization data handlers. The potential overhead of programming/interface re-design includes managing return codes/data, stack frame collapse mandates data to be passed up/down the chain, function/structure declarations change with additional data, and module interfaces change if function declarations change.

4.2 Programming Overhead

In traditional software development, any new requirements could map to a varying degree of complexity with associated programming overhead. In a distributed microservices architecture, there are additional constraints such as to cache the data with mutual exclusion principles both in memory and thread processing which has to be done all at compile/coding time, tracking success/errors across multiple threads and transactions becomes harder and thus adds on to programming overhead, etc.

As described herein, programming overhead can be defined as any of

Function interfaces change for passed/returned arguments across call stacks in running thread contexts;

Changes in stack/global data structures which introduce synchronization overheads for re-entrant programming;

The added complexity in applications for serialization and deserialization data handlers;

Tracking memory allocation and deallocation on <.bss/.xxdata> versus stack usage;

Some high-level languages like C do not provide data encapsulation associated with compile time polymorphism, or it adds to run time branching along with one of the above; and Some high-level languages like C do not provide data encapsulation associated with runtime polymorphism, or it adds to programming overhead and code complexity.

That is, overhead is the cost associated with tracking data versus logical flow or interface definitions. The programming cost can be defined as the overhead of program maintenance due to the recursive nature in programming for a sub-task/session at compile time.

A global data store could be a solution for some cases, but this does not work under a multi-thread approach as it leads to non-linear mapping causing locks and synchronization overhead.

FIG. 14 is a diagram illustrating programming overhead and the cost of recursion with stack-oriented programming. The questions from FIG. 14 include—what if the functions only implement run-time logic O(N), and what if the functions scope a session/sub-task of run-time logic without worrying about passing data across. The programming costs is the overhead of program maintenance due to recursive nature in programming for a sub-task/session at compile time, i.e., function_N, function_N−1, function_N−2, . . . .

One function interface change spreads across subsystems and services and sometimes to more interface changes. Runtime allocation/free and synchronization overheads, and it is prone to programming errors. Allocation on the stack or in a heap of extra data which may not even be required for the current session or subtask.

4.3 Virtual Tasks and Virtual Stacks

The present disclosure utilizes virtual tasks (also referred to as sessions/session stacks) and virtual stacks (also referred to as attribute/descriptor stacks). The following provides definitions used herein:

| Name | Definition |
|---|---|
| Descriptor | Meta-data definition associated with each data type (Data-driven model), i.e., descriptors are auto-generated based on schema driven models (e.g., YANG/YAML/XML, etc.) |
| Attribute | Simple named types (uint8_t, strings, struct, . . . ), key-value pairs |
| Virtual Stack | Attribute or Descriptor stack |
| Virtual task | Tree/Hash/. . . of stacks of descriptors |
| Virtual task-stack | Stack of Virtual tasks |

| Constraint/Capabilities | Comment |
|---|---|
| O(N) | A function only implements run-time logic and handling of the new requirement |
| No synchronization | Thread-specific behavior which is defined at runtime, thus no association to program or compile-time declarations. |
| Only new declares | New requirements do-not change existing declarations |
| Minimal impact | No additional stack/heap allocation for data which is not relevant to a sub-task at hand |
| Minimize cascading changes in recursive frames | Sub-tasks can be recursive or independent or interleave in any fashion without a change in function/structure definitions |
| Virtual tasks support interleaving | Virtual tasks can be interleaved in any fashion. However, the most common use case for interleaving is recursive. |
| Virtual tasks should support merge/collapse | Interleaved virtual tasks should be allowed to collapse to a specified depth along with merge of virtual stacks |
| Virtual stacks should support collapse/merge | Virtual stacks can be merged across Source (SRC)<>Destination (DST) virtual tasks or to a specified depth |
| Virtual stacks should be schema driven | If the parent virtual tasks span across messaging boundaries, virtua lstacks should be schema driven |

Figure 15:
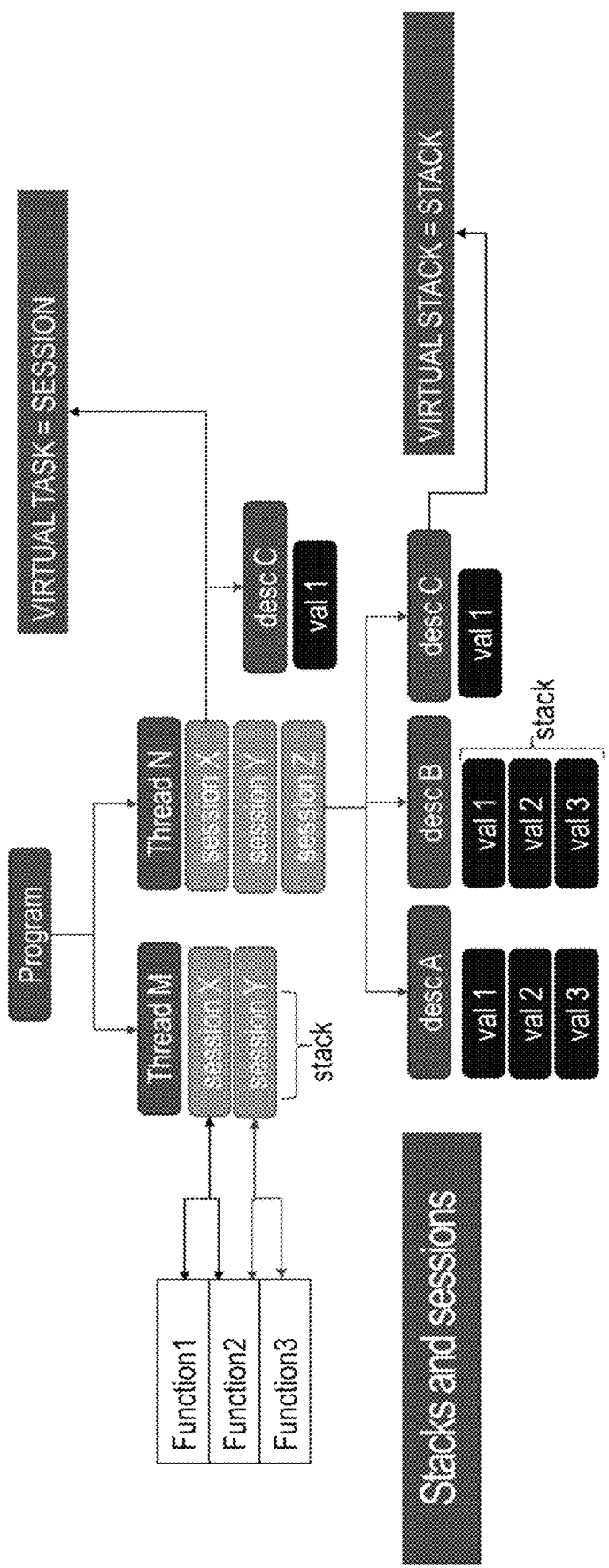
FIG. 15 is a block diagram of a runtime diagram of virtual tasks and virtual stacks.

FIG. 15 is a block diagram of a runtime diagram of virtual tasks and virtual stacks. At boundaries of this model, the data contained in the stacks can be integrated into the native stack of the thread, or logged or discarded, or packaged as opaque data that is passed through to another service that knows how to decode it.

Figure 16:
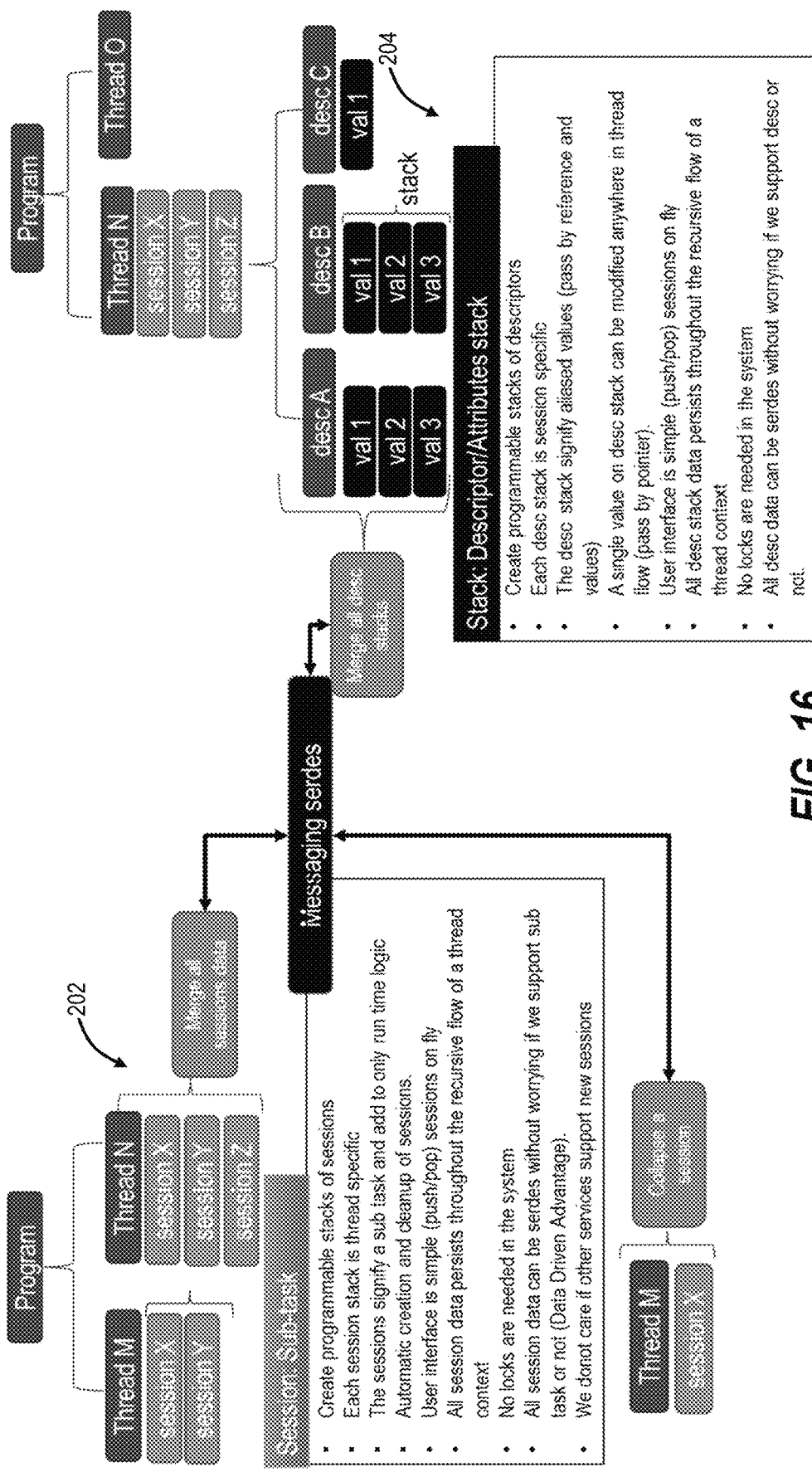
FIG. 16 is a block diagram of distributed architecture flows utilizing virtual tasks and virtual stacks.

FIG. 16 is a block diagram of distributed architecture flows utilizing virtual tasks 202 and virtual stacks 204. For virtual tasks 202, the distributed architecture creates programmable stacks of sessions, each session stack is thread specific. The sessions signify a subtask and add to only run time logic. There is an automatic creation and cleanup of sessions. The user interface is simple (push/pop) sessions on the fly. All session data persists throughout the recursive flow of a thread context. No locks are needed in the system. All session data can be serialized/deserialized (serdes) without worrying if a subtask is supported or not (Data Driven Advantage). It does not matter if other services support new sessions.

For the virtual stacks 204, the distributed architecture creates programmable stacks of descriptors, each descriptor stack is session specific. The descriptor stack signifies aliased values (pass by reference and values). A single value on the descriptor stack can be modified anywhere in thread flow (pass by pointer). The user interface is simple (push/pop) sessions on the fly. All descriptor stack persists throughout the recursive flow of a thread context. No locks are needed in the system.

FIG. 17 is a diagram of an example session API for the virtual tasks 202. FIG. 18 is a diagram of an example descriptor API for the virtual stacks 204. These programmable stacks can be used in current mechanisms for functions such as transactional data, Return Codes, asynchronous messaging, streaming, etc. Virtual tasks and stacks can be implemented in any high-level language.

FIG. 19 is a diagram of example code utilizing the virtual tasks and virtual stacks. The greatest flexibility is to just write runtime logic and treat the sub-task as sessions and descriptor stacks as the workbench. There is no need to modify the structures, synchronization, and cleanup (heap/stack)—A session pop cleans up data at runtime (no leaks). The framework based tracking and runtime logging of misbehaving tasks and stack misuse. An example is given in FIG. 19 where there is a need for a new task, and it does not require any changes other than writing new logic thus segregating logical flow from modifying the structures, synchronization, and cleanup on heaps and stacks.

Figure 20:
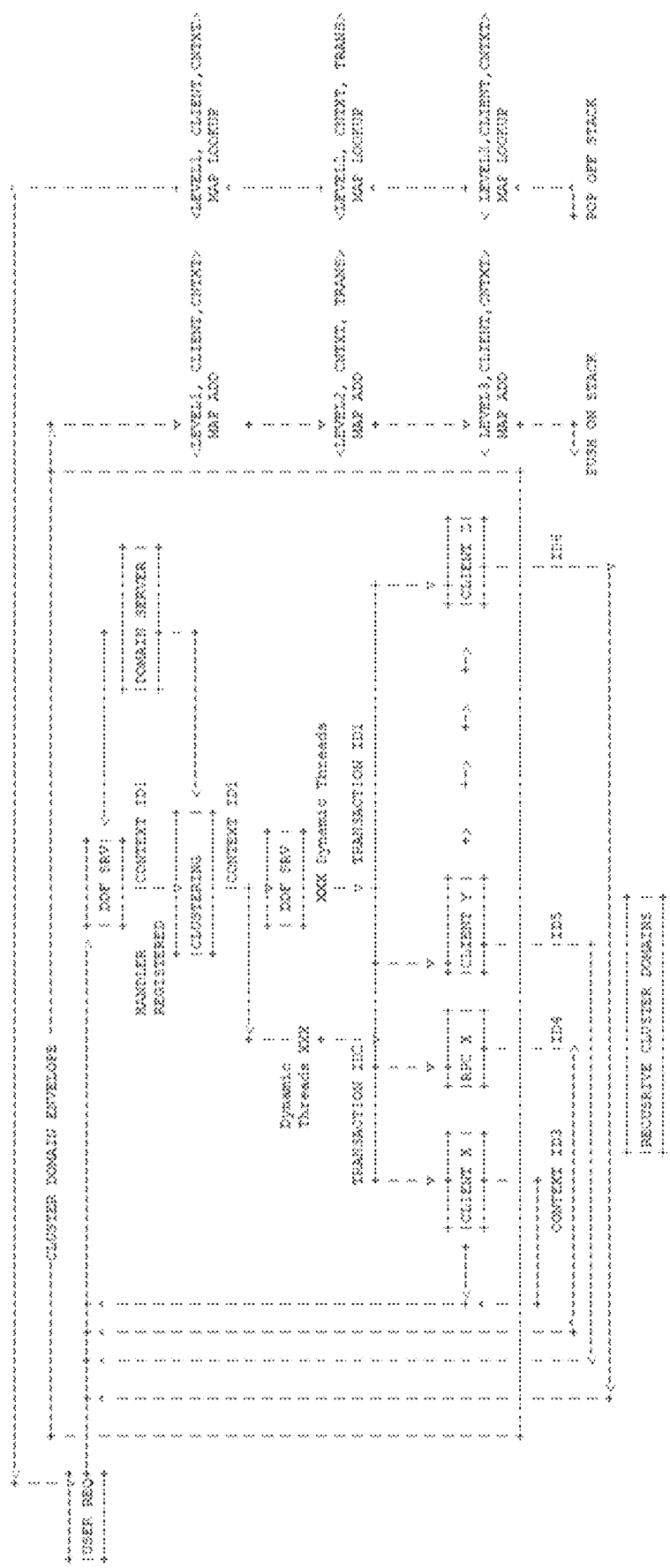
FIG. 20 is a diagram of example recursive cluster domains for a use case of virtual stacks and virtual tasks.

FIG. 20 is a diagram of example recursive cluster domains for a use case of virtual stacks and virtual tasks. The left half <CLUSTER DOMAIN ENVELOPE> in the FIG. 20 indicates the functional diagram for a transaction which could take advantage of multi-threaded programming. However, writing code this way would be harder than shown on right-half. The right half in FIG. 20 shows the repetitive logical flow as part of transactions in a distributed architecture. It is very straightforward to see the logical flow is simply two calls <MAP ADD> and <MAP LOOKUP>. Thus, it can be represented as <VIRTUAL TASKS> and the parameters <Level N, CLIENT, CTXT, . . . > all can be pushed onto <VIRTUAL STACKS>. This delineates the logical flow from data type dependencies. One could argue a C++ Template model could have sufficed. However, that is compile-time driven, here these <VITUAL TASKS>, <VIRTUAL STACKS> are created at runtime based on the type of transaction being handled. Secondly, the <VITUAL TASKS>, <VIRTUAL STACKS> can span across message/processor boundaries. This is achieved since the virtual tasks, and virtual stacks are schema driven and can be easily encoded and decoded. For a distributed microservices architecture that plays a crucial role.

The following tables illustrate example APIs for virtual stacks and virtual tasks.

| API | ROLE |
|---|---|
| DDY_PUSH_DESC | Push DESC on VIRTUAL STACK. Also creates VIRTUAL TASK if not existing |
| DDY_POP_DESC | Pop DESC from VIRTUAL STACK. Do not clean VIRTUAL STACK |

-continued

| API | ROLE |
| --- | --- |
| DDY_DESC_STACK_DEPTH | Get VIRTUAL STACK depth for a DESC |
| DDY_GET_NEXT_DESC | Get next DESC value from VIRTUAL STACK |
| DDY_MERGE_DESC | Merge a DESC across VIRTUAL TASKS |
| DDY_COLLAPSE_DESC | Collapse a DESC across VIRTUAL TASKS |
| DDY_FIND_DESC | Find a DESC across VIRTUAL TASKS |

| API | ROLE |
| --- | --- |
| DDY_PUSH_SESSION | Push VIRTUAL TASK on VIRTUAL TASK-STACK. This stack is context specific, thus no locks! and thus only linear mappings allowed. |
| DDY_POP_SESSION | Pop VIRTUAL TASK from VIRTUAL TASK-STACK. Cleanup all VIRTUAL STACKS |
| DDY_SESSION_STACK_DEPTH | Get VIRTUAL TASK-STACK depth for the current context |
| DDY_GET_NEXT_SESSION | Get next VIRTUAL TASK value from VIRTUAL TASK-STACK |
| DDY_MERGE_SESSION | Merge a VIRTUAL TASK with other VIRTUAL TASK within the same context |
| DDY_COLLAPSE_SESSION | Collapse a VIRTUAL TASK IN A VIRTUAL TASK-STACK |
| DDY_FIND_SESSION | Find a VIRTUAL TASK across VIRTUAL TASK-STACK |

4.4 Virtual Tasks and Virtual Stacks Process

Figure 21:
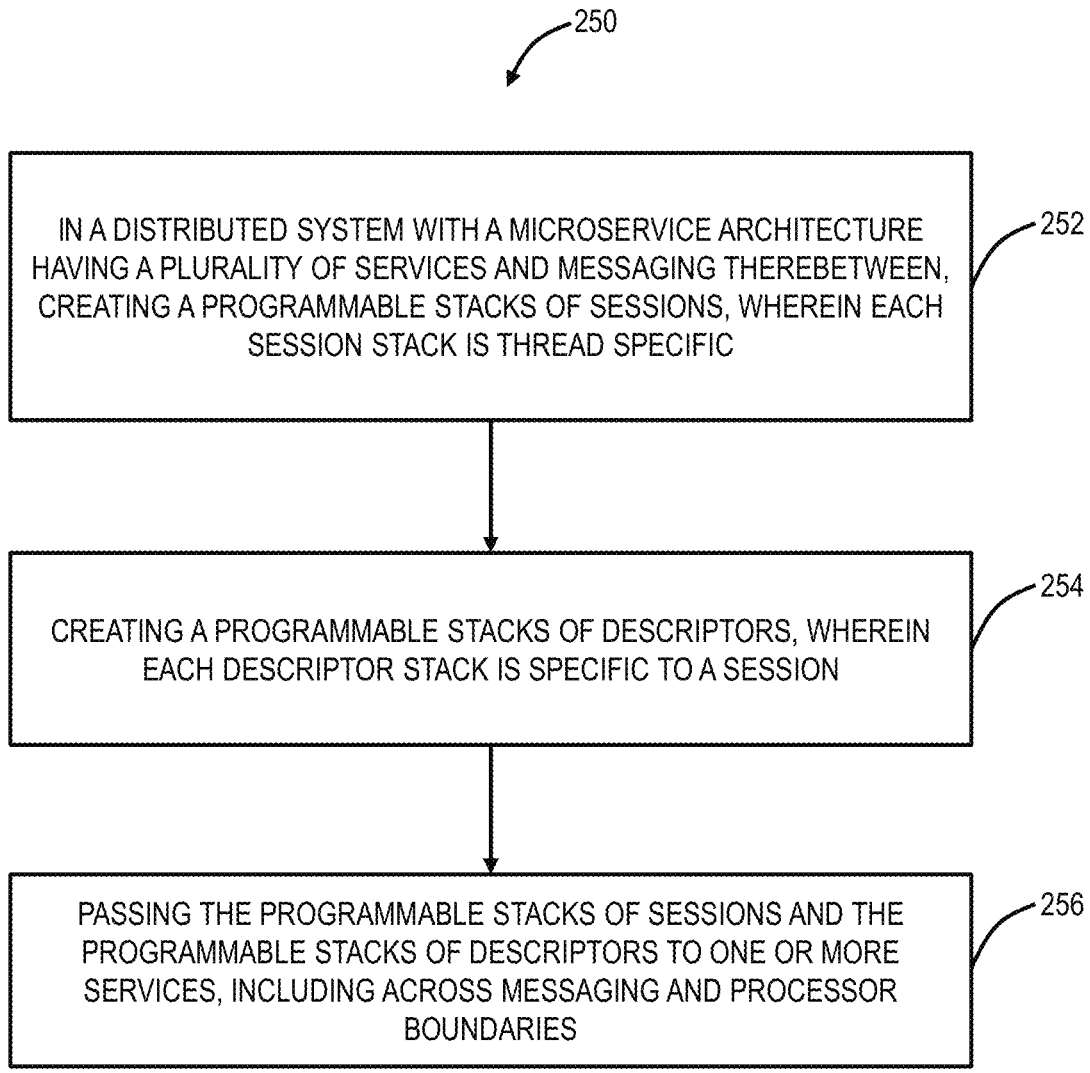
FIG. 21 is a flowchart of a process for virtual tasks and virtual stacks.

FIG. 21 is a flowchart of a process 250 for virtual tasks and virtual stacks. The process 250 includes, in a distributed system with a microservice architecture having a plurality of services and messaging therebetween, creating a programmable stacks of sessions, wherein each session stack is thread specific (step 252); creating a programmable stacks of descriptors, wherein each descriptor stack is specific to a session (step 254); and passing the programmable stacks of sessions and the programmable stacks of descriptors to one or more services, including across messaging and processor boundaries (step 256).

The programmable stacks of sessions and the programmable stacks of descriptors can be utilized for any of Transactional data, Return Codes, Asynchronous messaging, and streaming. The programmable stacks of sessions can be virtual tasks that are created at runtime. The programmable stacks of descriptors can be virtual stacks that are created at runtime. The programmable stacks of sessions and the programmable stacks of descriptors can be schema driven. The programmable stacks of sessions can be automatically created and cleaned up.

5.0 Processing Hardware Example

Figure 22:
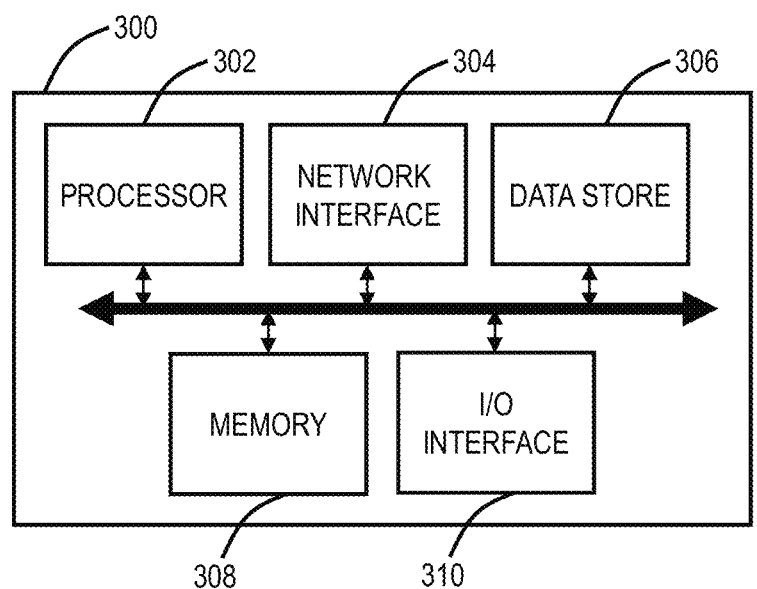
FIG. 22 is a block diagram of processing hardware.

FIG. 22 is a block diagram of processing hardware 300. The processing hardware 300 can be part of a distributed system, executing a microservices architecture. For example, the processing hardware 300 can be used to execute services in a distributed system. The processing hardware 300 can include a processor 302, which is a hardware device for executing software instructions. The processor 302 can be any custom made or commercially available processor, a central processing unit (CPU), an auxiliary processor among several processors associated with the processing hardware 300, a semiconductor-based microprocessor (in the form of a microchip or chip set), or generally any device for executing software instructions. When the processing hardware 300 is in operation, the processor 302 is configured to execute software stored within the memory, to communicate data to and from memory 308, and to generally control operations of the processing hardware 300 pursuant to the software instructions. The processing hardware 300 can also include a network interface 304, a data store 306, memory 308, an I/O interface 310, and the like, all of which are communicatively coupled to one another and to the processor 302.

The network interface 304 can be used to enable the processing hardware 300 to communicate on a network. The network interface 304 can include, for example, an Ethernet card or a wireless local area network (WLAN) card. The network interface 304 can include address, control, and/or data connections to enable appropriate communications on the network. The data store 306 can be used to store data, such as control plane information, provisioning data, OAM&P data, etc. The data store 306 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 can incorporate electronic, magnetic, optical, and/or other types of storage media. The memory 308 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 can have a distributed architecture, where various components are situated remotely from one another but may be accessed by the processor 302. The I/O interface 310 includes components for the processing hardware 300 to communicate with other devices, such as other processing hardware 300, e.g., via a bus, backplane, midplane, etc.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform the steps of:
   in a distributed system with a microservice architecture having a plurality of services and a messaging layer between an application layer and a transport layer for communication between the plurality of services, receiving messages from a first service to a second service in the messaging layer;
   queuing responses from the messages; and
   utilizing one or more bulk messaging techniques to send the responses back to the first service from the second service, wherein the messaging layer is configured to perform the queuing the responses and the utilizing the one or more bulk messaging techniques independent of the first service, the second service, and the transport protocol of the transport layer.

2. The non-transitory computer-readable medium of claim 1, wherein the instructions that, when executed, further cause the processor to perform the steps of
   maintaining statistics related to the one or more bulk messaging techniques; and
   automatically determining which of the one or more bulk messaging techniques based on the statistics, to minimize latency of the messaging layer.

3. The non-transitory computer-readable medium of claim 1, wherein the one or more bulk messaging techniques include any of time window-based bulking, counter-based bulking, size-based bulking, and transaction-based bulking.

4. The non-transitory computer-readable medium of claim 1, wherein the one or more bulk messaging techniques include multiple bulk messaging techniques, selected to minimize latency of the messaging layer.

5. The non-transitory computer-readable medium of claim 1, wherein the one or more bulk messaging techniques include time window-based bulking where the queuing is over a predetermined time window.

6. The non-transitory computer-readable medium of claim 1, wherein the one or more bulk messaging techniques include counter-based bulking where the queuing is based on a counter.

7. The non-transitory computer-readable medium of claim 1, wherein the one or more bulk messaging techniques include size-based bulking where the queuing is based on a size of each response.

8. The non-transitory computer-readable medium of claim 1, wherein the one or more bulk messaging techniques include transaction-based bulking where the queuing is based on a transaction tag.

9. The non-transitory computer-readable medium of claim 1, wherein the first service is configured to provide information in one or more of the messages related to the one or more bulk messaging techniques.

10. An apparatus comprising:
    a processor and memory comprising instructions that, when executed, cause the processor to execute a messaging layer, between an application layer and a transport layer, for communication between a plurality of services in a distributed system with a microservice architecture, wherein the messaging layer is configured to
       receive messages from a first service to a second service in the messaging layer,
       queue responses from the messages, and
       utilize one or more bulk messaging techniques to send the responses back to the first service from the second service,
    wherein the messaging layer is configured to perform the queuing the responses and the utilizing the one or more bulk messaging techniques independent of the first service, the second service, and the transport protocol of the transport layer.

11. The apparatus of claim 10, wherein the messaging layer is further configured to
    maintain statistics related to the one or more bulk messaging techniques, and
    automatically determine which of the one or more bulk messaging techniques based on the statistics, to minimize latency of the messaging layer.

12. The apparatus of claim 10, wherein the one or more bulk messaging techniques include any of time window-based bulking, counter-based bulking, size-based bulking, and transaction-based bulking.

13. The apparatus of claim 10, wherein the one or more bulk messaging techniques include multiple bulk messaging techniques, selected to minimize latency of the messaging layer.

14. The apparatus of claim 10, wherein the one or more bulk messaging techniques include time window-based bulking where the queue is over a predetermined time window.

15. The apparatus of claim 10, wherein the one or more bulk messaging techniques include counter-based bulking where the queue is based on a counter.

16. The apparatus of claim 10, wherein the one or more bulk messaging techniques include size-based bulking where the queue is based on a size of each response.

17. The apparatus of claim 10, wherein the one or more bulk messaging techniques include transaction-based bulking where the queue is based on a transaction tag.

18. The apparatus of claim 10, wherein the first service is configured to provide information in one or more of the messages related to the one or more bulk messaging techniques.

19. A computer-implemented method comprising:
in a distributed system with a microservice architecture having a plurality of services and a messaging layer between an application layer and a transport layer for communication between the plurality of services, receiving messages from a first service to a second service in the messaging layer;
queuing responses from the messages; and
utilizing one or more bulk messaging techniques to send the responses back to the first service from the second service,
wherein the messaging layer is configured to perform the queuing the responses and the utilizing the one or more bulk messaging techniques independent of the first service, the second service, and transport protocol of the transport layer.

20. The computer-implemented method of claim 19, further comprising
maintaining statistics related to the one or more bulk messaging techniques; and
automatically determining which of the one or more bulk messaging techniques based on the statistics, to minimize latency of the messaging layer.

* * * * *